Aug. 22, 1950          W. H. LANG          2,519,970
PUSHER CONVEYER WITH SUPPLY HOPPER
Filed May 1, 1946          2 Sheets-Sheet 1
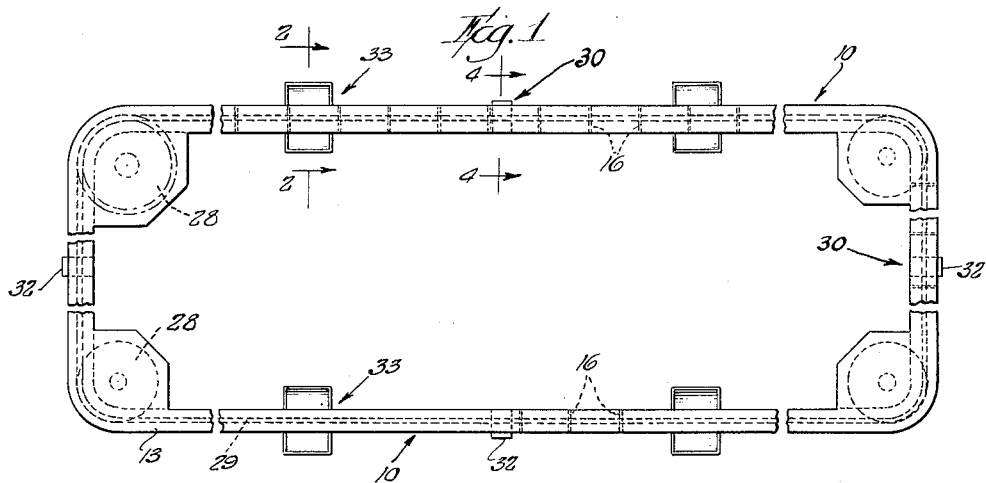
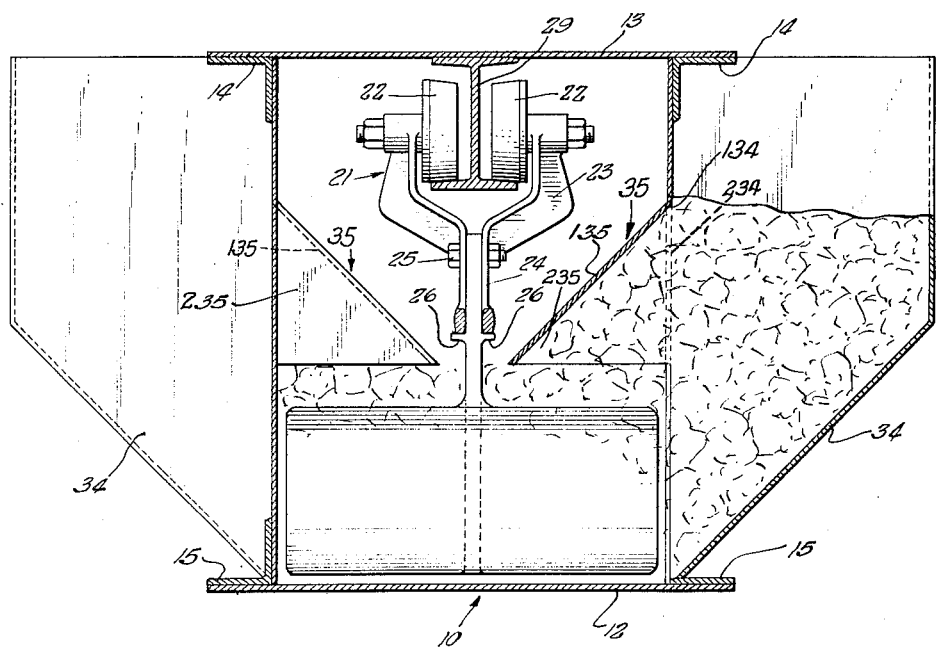
INVENTOR.
William H. Lang
BY
Albert G. McCaleb
Atty.

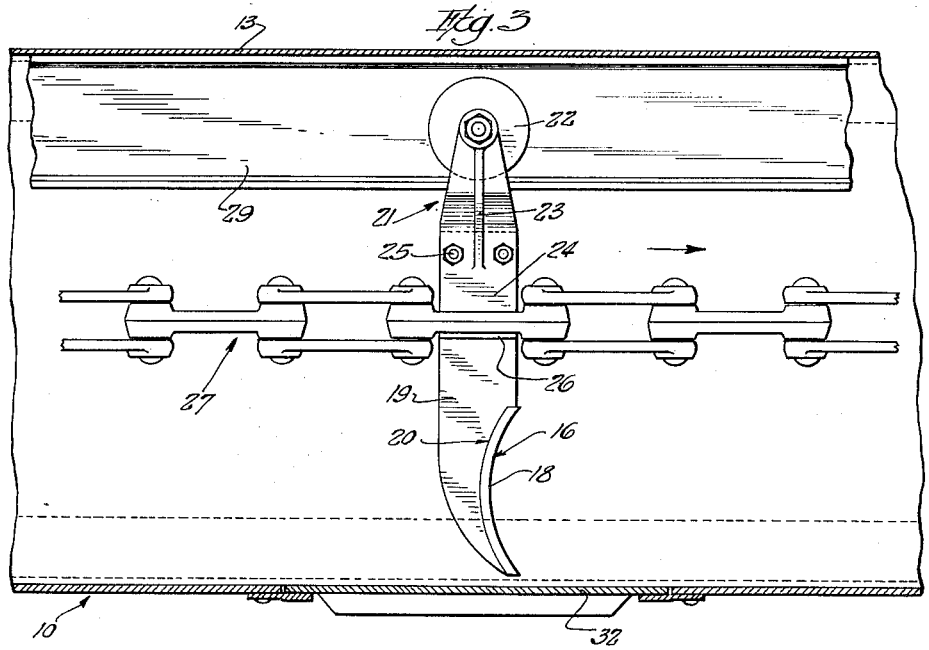
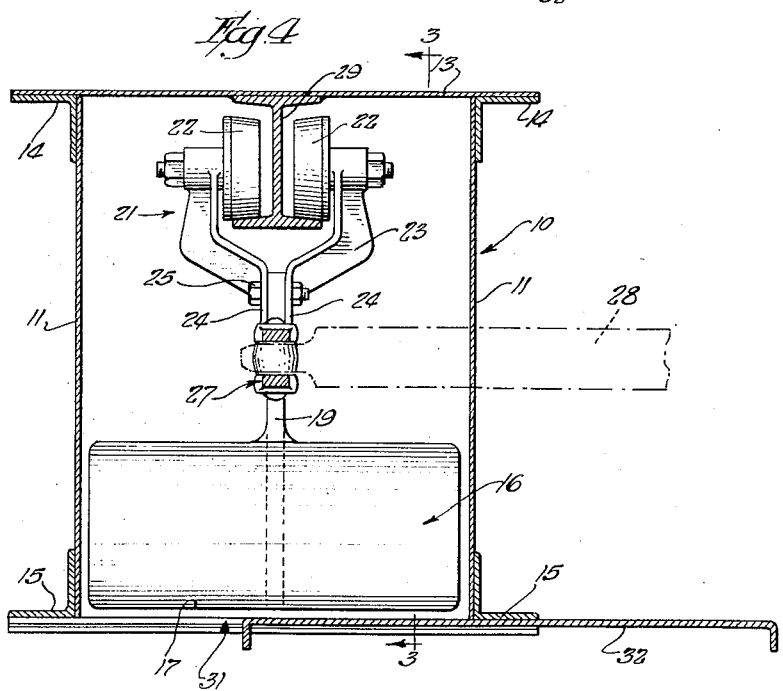

Patented Aug. 22, 1950

2,519,970

UNITED STATES PATENT OFFICE 2,519,970

PUSHER CONVEYER WITH SUPPLY HOPPER

William H. Lang, Chicago, Ill., assignor to The Fairfield Engineering Company, Marion, Ohio, a corporation of Ohio Application May 1, 1946, Serial No. 666,352

2 Claims. (Cl. 198—56)

My invention contemplates and provides a conveyor, and more particularly a recirculating conveyor, which is of simple and sturdy construction, efficient in operation, and economical to construct and maintain in service.

By a recirculating conveyor, as I employ such designation, is meant one comprising an endless trough or channel wherefrom and whereto relatively small-sized coal or other mechanically flowable solid material is discharged and supplied and which intermediate successive discharges therefrom may remain loaded to predetermined capacity with traveling solid material.

An object of my invention is to provide a highly satisfactory recirculating conveyor wherein the conveyed solid material is propelled through the endless trough or channel by a plurality of spaced-apart flexibly connected flights disposed in proximity to but never contacting the trough or conduit as the flights weave and turn in traveling their endless path.

Another object of my invention is generally and substantially to improve the construction and operation of conveyors which comprise spaced-apart flights moved through a trough or channel by means of a flexible tension member to which the flights are attached.

A preferred embodiment of my invention comprises in combination with an endless trough from whence conveyed material is dischargeable by gravity at several points: A multiplicity of spaced-apart flights in the form of blades, of width somewhat less than the width of the trough, so profiled as to impede upsurges of the material which they contact and propel and normally to be urged downwardly by the weight of such material; rail-supported trolleys each comprising a harp having a relatively rigid downward extension which carries and desirably is an integer with one of the blades; a power-driven sprocket chain which connects with each trolley-and-blade unit intermediate the trolley and the blade; and a plurality of sets of trough inlets, each of said sets of inlets functioning from time to time automatically to admit to an adjacent portion of the trough, up to a plane between the blades and the sprocket chain, a replenishment of the solid material being circulated in the trough.

The aforementioned and other objects, features and advantages of my invention will appear from the following detailed description wherein reference is made to the accompanying two sheets of drawings, wherein:

Fig. 1 is a somewhat diagrammatic top plan view of a recirculating conveyor of my present invention;

Fig. 2 is a vertical sectional view which may be regarded as taken on the line 2—2 of Fig. 1 and looking in the direction indicated by the arrows;

Fig. 3 is a vertical sectional view which may be regarded as taken on the line 3—3 of Fig. 4 and looking in the direction indicated by the arrows; and Fig. 4 is a vertical sectional view which may be regarded as taken on the line 4—4 of Fig. 1 and looking in the direction indicated by the arrows.

Similar characters of reference refer to similar parts throughout the several views.

In the drawings, reference numeral 10 indicates as a whole an endless conduit. The lower portion of this conduit constitutes a trough or channel in which small-sized coal or other mechanically flowable solids are circulated as and by the devices hereinafter described.

Conduit 10, which usually is supported by joists or joist-like structural members (not shown) lying either above or below it, may comprise side walls 11, bottom 12, top 13, angle members 14 which lie in the exterior angles between and are welded or otherwise secured to the top and sides, and other angle members 15 which similarly are related to the bottom and sides.

Disposed in and transversely of the lower or trough portion of conduit 10 is a multiplicity of spaced-apart blades 16. Each of these blades 16 has a width somewhat less than the width of the trough portion of conduit 10. It also has a substantially straight lower edge 17, a cylindrically concave leading surface 18, and an upwardly extending arm 19 which desirably is rigidly and integrally joined with the convex trailing surface 20 of the blade.

Associated with each of the blades 16, and at all times cooperating with the hereinafter-mentioned sprocket chain to retain the lower and lateral edges of the blade out of contact with the bottom and side walls of the trough while maintaining the upper and lower edges of the blade in substantially the same vertical plane, is a trolley 21.

Each of the trolleys 21 comprises the spaced-apart flangeless wheels 22 afforded bearings for rotation on a common axis by the arms 23 of the trolley harp.

The lower ends 24 of the arms 23 of each trolley harp are conformed to lie in parallelism with each other on opposite sides of the upper end of a blade arm 19 to which they are rigidly secured by bolts 26 and their cooperating nuts.

Each blade 19 is provided with a pair of oppositely and laterally projecting shoulders 26, and receiving the upper end of each said arm 19 and snugly held to its shoulders 26 by the extremities of the lower ends 24 of the associated trolley harp arms, is one of the horizontally disposed links of an endless sprocket chain 27.

Sprocket chain 27 suitably is trained over a plurality of sprocket wheels 28 one of which is suitably power driven by appropriate means not shown. The adjacent portion of the inner one of the conduit walls 11 is suitably slotted to accommodate cooperation of each sprocket wheel 28 with the chain 27.

Coextensive with conduit 10, and supported in the position shown by being welded to the conduit top 13 or otherwise, is the trolley rail 29, upon the upper surfaces of the lower flanges of which the wheels 22 of the several trolleys 21 roll.

At a plurality of discharge points, indicated at 30 in Fig. 1, the conveyor trough is provided with bottom openings 31 which in certain instances may be permanently open (as for example when a stoker hopper directly underlies the opening) and in other instances may be closable by laterally sliding doors 32 which, when closed, lie end to end with and in the same plane as contiguous portions of the trough bottom 12.

At a plurality of supply points, indicated at 33 in Fig. 1, the conduit 11 is provided with appropriately disposed lateral inlets 34, each of which is provided with a visor 35 which at all times permits the movement of coal or the like from the inlet into the lower or trough portion of the conduit up to but not above a plane in which the lower edges of the visor lie, being a plane which preferably is located substantially above the upper edges of the blades 19 but substantially below the chain 27.

Each visor 35 suitably consists, as shown, of a downwardly and inwardly inclined top wall 135 and a pair of spaced apart end walls 235 that are right triangles between the hypotenuse sides of which the top wall 135 extends; the lower edges of the top wall 135 and the end walls 235 occupying the same horizontal plane. Each inlet 34 communicates with conduit 10 through a passage in the nature of a rectangular fenestration with which one of the visors 35 is associated; the top wall of the visor extending inwardly and downwardly of the conduit 10 from the upper horizontal boundary 134 of such passage. Such upper horizontal boundary 134 of the passage I prefer to call its "lintel boundary." The end walls 235 of each visor 35 extend inwardly of the conduit 10 from the upper portion of the vertical sides 234 of the passage or fenestration with which the visor is associated, and such vertical sides 234 of the passage or fenestration I prefer to call its "lateral boundaries."

By way of example, and not for purpose of limitation because the dimensions of the several parts of my conveyor may be varied within wide limits, I will say that the hereinbefore-described equipment of my invention admirably is suited to handle the comparatively small size coal now commonly supplied to furnace stokers when the principal dimensions of the blades are about 5" x 11", the inside width of the conduit is about 12" and its inside height about 16", the spacing between the blade and trolley units is about 24", and the distance between the wheel axis of each trolley and the medial horizontal plane of the chain link directly associated with that trolley is about 5¾".

The hereinbefore described recirculating conveyor fills a long-felt want for a simple and acceptably efficient equipment of reasonably light construction capable of conveying coal or the like from one or more supply points to one or more discharge points without functioning quickly to destroy itself. It is believed to be without prototype in the prior art. By virtue of the cooperation of the trolleys and the chain with which they are associated, its several material propelling blades weave and turn in traveling their endless path without at any time striking the sides or bottom of the trough in which they move. The trough or portions thereof may be disposed either horizontally or angularly to the horizontal. Whenever any discharge opening of the trough is unblocked, by a door or previously admitted coal or the like which has not yet moved away from the opening, coal or the like is emitted from that opening and additional similar solid material is supplied to the trough to maintain substantially uniform its content of the solid material moving therein. When no discharge opening is unblocked, the coal or like solid material circulates and recirculates in the trough without having the quantity thereof increased. Other advantages of my invention will be apparent to persons skilled in the art to which it relates.

Having thus illustrated and described a presently preferred embodiment of my invention, I do not limit myself to the details thereof but wish to cover all equivalent embodiments falling within the scope of the appended claims.

What I claim as new and desire to secure by Letters Patent of the United States is:

1. Conveyor apparatus comprising a substantially endless trough, a plurality of flights of less width than the trough disposed in and transversely thereof, a trolley overlying each flight and comprising a member to which the flight is attached, an endless flexible tension member along which the flights are spaced and with which they are connected, devices for moving the tension member through the trough, a trolley support overlying and substantially coextensive with the trough wherewith the several trolleys cooperate to hold their associated flights out of contact with the trough while traveling therein, at least one outlet for said trough through which conveyed solid material may be discharged, at least one inlet for said trough functioning to keep it substantially filled with conveyed solid material up to a plane underlying the tension member, said inlet comprising a pair of oppositely located passages formed in the sides of the trough, each said passage extending upwardly from the trough bottom and having a lintel boundary located substantially above the tension member, hoppers functioning to supply material for movement into the trough through said passages, and a visor for the upper portion of each of said passages, each said visor extending inwardly and downwardly from the lintel boundary of its associated passage and inwardly from the upper portions of the lateral boundaries of said passage to lie in proximate spaced relationship to the other visor and to present a lower visor edge occupying a plane beneath the tension member.

2. Conveyor apparatus comprising a substantially endless trough, a plurality of flights of less width than the trough disposed in and transversely thereof, a trolley overlying each flight and comprising a member to which the flight is attached, an endless flexible tension member along which the flights are spaced and with which they are connected, devices for moving the tension member through the trough, a trolley support overlying and substantially coextensive with the trough wherewith the several trolleys cooperate to hold their associated flights out of contact with the trough while traveling therein, at least one outlet for said trough through which conveyed solid material may be discharged, at least one inlet for said trough functioning to keep it substantially filled with conveyed solid material up to a plane underlying the tension member, said inlet comprising a pair of passages formed in opposite sides of the trough, each such passage extending upwardly from the trough bottom and having a lintel boundary located substantially above the tension member, hoppers functioning to supply material for movement into the trough through said passage, and a visor for the upper portion of each of said passages, each said visor extending inwardly and downwardly from the lintel boundary of its associated passage and inwardly from the upper portions of the lateral boundaries of said passage to lie in proximate spaced relationship to the tension member and to present a lower visor edge occupying a plane beneath the tension member.

WILLIAM H. LANG.

REFERENCES CITED

The following references are of record in the file of this patent:

UNITED STATES PATENTS

| Number | Name | Date |
|---|---|---|
| 723,971 | Acklin | Mar. 31, 1903 |
| 751,885 | Webster | Feb. 9, 1904 |
| 1,721,316 | Pribil | July 16, 1929 |
| 2,178,342 | Hapman | Oct. 31, 1939 |
| 2,366,569 | Sinden | Jan. 2, 1945 |